(12) United States Patent
Hiyokawa et al.

(10) Patent No.: US 6,415,225 B1
(45) Date of Patent: Jul. 2, 2002

(54) NAVIGATION SYSTEM AND A MEMORY MEDIUM

(75) Inventors: Toyoji Hiyokawa; Masaya Yamaguchi, both of Okazaki (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 09/632,794

(22) Filed: Aug. 4, 2000

(30) Foreign Application Priority Data

Aug. 6, 1999 (JP) .......................................... 11-223917

(51) Int. Cl.[7] .......................... G01C 21/00; G01S 1/02; G01S 5/02; G06F 7/00; G06F 9/00; G06F 17/00; G06F 19/00

(52) U.S. Cl. .............................. 701/209; 701/200–208; 701/210–215; 342/357.03; 342/357.01; 342/357.09; 342/357.13; 340/988; 340/989; 340/990; 340/994; 340/995

(58) Field of Search ................................ 701/200–215; 342/357.03, 357.01, 357.09, 357.13; 340/988, 989, 990, 994, 995

(56) References Cited

U.S. PATENT DOCUMENTS

| | | | | |
|---|---|---|---|---|
| 5,634,190 A | * | 5/1997 | Wiedeman ................. 455/13.1 |
| 5,802,492 A | * | 9/1998 | DeLorme et al. ............ 701/200 |
| 5,808,565 A | * | 9/1998 | Matta et al. ................. 340/994 |
| 5,845,227 A | * | 12/1998 | Peterson ...................... 701/209 |
| 5,848,373 A | * | 12/1998 | DeLorme et al. ............ 701/200 |
| 6,018,697 A | * | 1/2000 | Morimoto et al. ........... 701/209 |
| 6,118,404 A | * | 9/2000 | Fernekes ................. 342/357.13 |

* cited by examiner

*Primary Examiner*—William A. Cuchlinski, Jr.
*Assistant Examiner*—Ronnie Mancho
(74) *Attorney, Agent, or Firm*—Oliff & Berridge PLC

(57) ABSTRACT

A system for executing guidance to a destination properly even if the destination is connected to a non-guidance target road, such as a small street. The system has a judgment device for determining whether a road connecting to a destination on the searched route is a non-guidance target road, a controller for determining a guidance terminating point on the basis of the determinative result of the judgment device, wherein if a road connecting to a destination is a non-guidance target road as determined by the judgment device, then the last intersection point of the guidance target road to the non-guidance target road or a road end closest to the departure side of the non-guidance target road is determined as a guidance terminating point.

17 Claims, 9 Drawing Sheets

| Road Data (N) | |
|---|---|
| 1 | Information on Coordinates (Node) |
| | Link Information |
| | Traffic Restriction Flag (Presence) |
| | Information on Traffic Restrictions (In) |
| | •  •  •  • |
| 2 | Information on Coordinates (Node) |
| | Link Information |
| | Traffic Restriction Flag (Absence) |
| | •  •  •  • |
| ⋮ | ⋮ |
| N | •  •  •  • |

Fig. 2

NAVIGATION SYSTEM AND A MEMORY MEDIUM

BACKGROUND OF THE INVENTION

1. Field of Invention

The invention relates to a navigation system and a memory medium that improve a method of determining a guidance terminating point when a road proximate to a destination is determined as a non-guidance target road due to restriction and the like.

2. Description of Related Art

According to a previous navigation system, road data are separately stored for route guidance, and display. The road data for route guidance are used for route search and route guidance. The road data for display are used for displaying a map. Route guidance is executed by distinguishing guidance target roads from non-guidance target roads such as small streets or roads with other restrictions associated therewith. The data for route guidance are stored with accompanying information on traffic restrictions (no left turn, no right turn, no access, etc.) for each road section, and with cost data for recommended route search in view of distance and time, etc. However, data of non-guidance target roads, such as walkways or private roads, are not included in the road data for route guidance since they have sections where traffic restrictions are not checked. If restricted roads exist around a starting point or a destination, a recommended route is provided after a search whereby only roads the vehicle can access are displayed as the path to the desired destination. Alternatively roads with access restriction may be recognized and displayed, perhaps as roads to avoid.

Thus, if a last arrival point (a destination) is connected to a small street that is not previously included in the road data for route guidance, lines are perpendicularly drawn down from the destination to guidance target roads and a point at which the shortest perpendicular line comes into contact with the guidance target road is determined as a guidance terminating point.

An example shown in FIG. 11, if a point P1 on a walk way (W) from a guidance target road (R1) is the desired destination, a line drawn from the destination to contact perpendicularly guidance target road (R2) is the shortest perpendicular line. Therefore, this point P2 is determined as a guidance terminating point P2. In this method, however, guidance is eventually completed using the road (R2) that is not connected to the destination. In this case, for example, if a river runs between the guidance target road (R2) and the destination and there is no bridge near to connect the two, or the like, it is difficult for one to arrive at the destination from the guidance terminating point.

The invention addresses the above problem by executing guidance accurately when a destination connected to a non-guidance target road such as a small street is determined.

SUMMARY OF THE INVENTION

A navigation system according to the invention comprises a present position detecting means, an input means for inputting information necessary for searching a route or a destination, a report means for reporting route guidance information, an information memory means for storing data necessary for route search, a route search means for searching a route to a destination on the basis of information input by said input means and data stored in the information memory means, a judgment means for judging whether a road connected to a destination on the searched route is a guidance or a non-guidance target road, and a control means for setting a guidance terminating point on the basis of the result of said judgment means. Further, the navigation system according to the invention provides that the judgment means determines a connecting point between a guidance target road and a non-guidance target road, or the last intersection of the guidance target road to the non-guidance target road, or a road end point of the non-guidance target road closest to the destination side as a guidance terminating point. The navigation system according to the invention, provides guidance information around the destination when the position approaches within a predetermined distance from the destination or the guidance terminating point. Further, the navigation system according to the invention performs even when the non-guidance target road is a street with traffic restrictions. A memory medium according to the invention is also provided wherein a program is stored for detecting a vehicle present position, for searching for a route to a destination on the basis of input information and stored data, for judging whether a road connecting to the destination on the searched route is a guidance or a non-guidance target road, and for determining a guidance terminating point on the basis of the result of the judgment.

According to the invention, one can reach a destination by determining a connection point between a guidance target road and a non-guidance target road even when route guidance is terminated on the guidance target road.

BRIEF DESCRIPTION OF THE DRAWINGS

FIG. 2 is an example of road data structure according to the invention;

DETAILED DESCRIPTION OF PREFERRED EMBODIMENTS

The followings are embodiments of the invention, which will be described with reference to the drawings.

Figure 1:
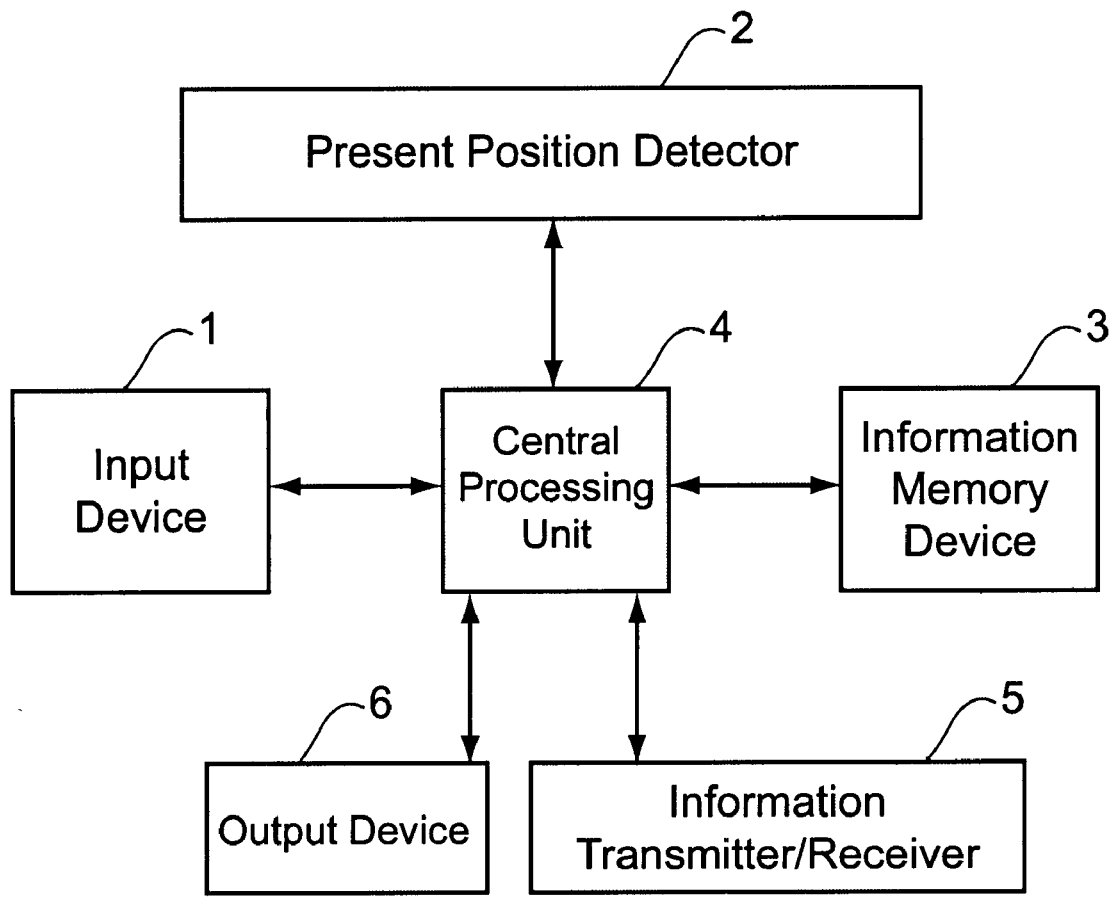
FIG. 1 is a diagram showing an example composition of vehicle navigation system according to the invention.

FIG. 1 is a diagram showing an example composition of a navigation system according to the invention. The invention includes an input device 1 for inputting information on route guidance; a present position detecting unit 2 for detecting information on a vehicle present position; an information memory unit 3 for storing navigation data required for calculation of routes, display/audio guidance data necessary for route guidance, programs (application and/or OS) and the like; a central processing unit 4 for providing control over the entire system; an information transmitter/receiver 5 for transmitting and receiving information on the vehicle when traveling, such as the vehicle's present position, or road and traffic information; and an output device 6 for outputting information on route guidance.

The input device 1 is provided with functions for inputting a destination and instructing the central processing unit 4 to execute the navigation processing in conformity with a driver's intention. As the means for attaining such functions, a remote controller, such as a touch switch or a jog dial, can be used for inputting a destination in the form of a telephone number or a coordinate on a map etc., and for requesting route guidance. Further, the invention provides a voice input device. A record card reader for reading data recorded in an IC card or a magnetic card may also be added. A data communication device may also be added to provide data communications between information sources, such as between an information center that accumulates navigation data and provides information via communication links upon the driver's request to a portable electronic device having map data, destination data, data of a simple frame map, a building shape map or the like.

The present position detector 2 is composed of a device for receiving information on the vehicle's present position by using the Global Positioning System (GPS). The GPS may use an absolute direction sensor, such as a geomagnetic device, to detect the travel direction of the vehicle, or it may use a relative direction sensor that detects the travel direction of the vehicle via a steering sensor and a gyro sensor. Still further, the GPS may use a distance sensor that detects the travel distance of the vehicle according to the number of revolutions of a wheel or the like.

The information memory device 3 is an external storage device in which programs and data for navigation are stored. The information memory device 3 may comprise a CD-ROM, a DVD-ROM or the like. The programs stored therein include a program for processing the route search. Such a processing program is shown in a flowchart of FIG. 5 described herein. A program for performing the display output control necessary for route guidance and for performing guidance in the interactive manner by voice input and necessary data therefor is also shown, as is a program for performing the voice output control necessary for the voice guidance and necessary data therefor. The data to be stored are composed of files, such as map data, search data, guidance data, map matching data, destination data, register point data, road data, genre data, landmark data and the like, wherein all the data necessary for navigation are stored. In addition, the invention can be applied to a system in which the CD-ROM only stores data and the central processing unit 4 stores the programs.

The central processing unit 4 comprises a CPU for performing various calculation processing; a flash memory for reading and storing the programs from the CD-ROM of the information memory device 3; a ROM for storing a program (or a program reading means) for checking and updating the programs contained in the flash memory; a RAM for temporarily storing the searched route guidance information, such as point coordinates of a set destination, a road name code No., and the like or data of the calculation processing. The central processing unit 4 further provides a voice processor for performing the communication processing by voice input from the input device 1. The voice processor is used for synthesizing a voice, a phrase, a sentence, a sound or the like read out from the information memory device 3 on the basis of the voice output control signals from the CPU. The voice processor transforms these signals into analog signals and outputs them to the speaker, to a communication interface for transferring the input/output data, to a sensor input interface for receiving the sensor signal of the present position detector 2, and to a clock for writing the date and time in internal diagnosis information. In addition, the program for updating processing may be stored in an external memory device.

The programs according to the invention and the other programs for executing navigation may be wholly stored in a CD-ROM as an external memory medium, or they may be partially or wholly stored in the ROM. The data and programs stored in the external memory medium, are input as external signals to the central processing unit 4 of the navigation system and are processed by calculation so that various navigation functions are realized.

As described above, the navigation system includes the flash memory which has a relatively large capacity for reading programs from the CD-ROM of the external memory device, and the ROM which has a relatively small capacity that contains a program (or program reading means) for starting the CD. The flash memory is a non-volatile memory means for maintaining the stored information even if the power is turned off. As an initial processing of the CD, the programs stored in the ROM are initiated to check the programs stored in the flash memory and to read the disc managing information etc., stored in the CD-ROM of the information memory device 3. The loading (or updating) operation of the programs is executed by determining that information and the state of the flash memory.

The information transmitter/receiver 5 comprises a GPS receiver for obtaining information by making use of the satellite navigation system, and a VICS receiver for obtaining information by making use of FM multi-channels, electric beacons, light beacons, etc. A data transmitter/receiver is exemplified by a portable telephone, a personal computer, etc., for exchanging the information with an information centre (e.g., ATIS), other vehicles, and the like.

The output device 6 is provided with functions for outputting voice/display guidance information as required by the driver, and for outputting the navigation data processed in the CPU 4 to the printer. As means for realizing these functions, the output device comprises a display for displaying input data on a screen or for displaying a route guidance screen, a printer for outputting and printing the data processed in the CPU 4 or the data stored in the information memory device 3, and a speaker for outputting route guidance by voice.

The display includes a color CRT or liquid-crystal display device, whereby the display screens show enlarged intersections, destination names, time, distances, travel direction arrows, personified character images and the like on the basis of the map data or guidance data processed by the central processing unit 4. The image data transmitted to the display are binary image data (bitmap data) so that not only a communication line used for a serial communication, but also other communication lines, can be used for the transmission. Thus the data are not transmitted through a special-purpose signal. Moreover, the display is provided with a memory for temporarily storing the bitmap data.

The display is mounted in the instrument panel of the vehicle in the vicinity of the driver's seat so that the driver is able to confirm the present position of the vehicle and obtain information on a next recommended route to follow. Moreover, the display may be composed such that points, or roads, etc., can be input by touching or tracing the display screen with a tablet including a touch panel, a touch screen etc., a detailed description of which is omitted.

A flow of the entire navigation system according to the invention is hereafter described. A program of route guidance is initiated after the program is read from the information processing device 3 into the central processing unit 4. A present position is detected by the present position detector 2. Then a vicinity map of the vehicle's present position is displayed with a name of the present position. Next, a destination is determined by using an object name identifier, such as a place name, a facility name, a telephone number, an address, a register point, a road name or the like, and a route search from the present position to the destination is executed. When a recommended route is determined, route guidance/display is repeated as the vehicle's present position is traced by the present position detector 2 until the vehicle arrives at the destination. If a new input desiring a vehicle to stop on the route before arriving at the original destination, a further search area is determined and a new search is made within the new search area, whereby route guidance is repeated in the same way as above until the vehicle arrives at the new desired destination. Thereafter, the vehicle can proceed to the original destination by implementing the original recommended route or by updating the search from its new beginning position.

FIG. 2 is an example of a road data structure according to the invention. In this example, the road data include traffic restriction flags showing the presence and absence of traffic restrictions, in addition to coordinate information that comprises node configurations presenting information on shape and location, and link information showing connections between roads. Namely, road data 1 provide a traffic restriction flag with information on traffic restrictions (eg., no access, no left turn, no right turn, etc.). Road data 2 provide no flag and do not store information on traffic restrictions.

Figure 3:
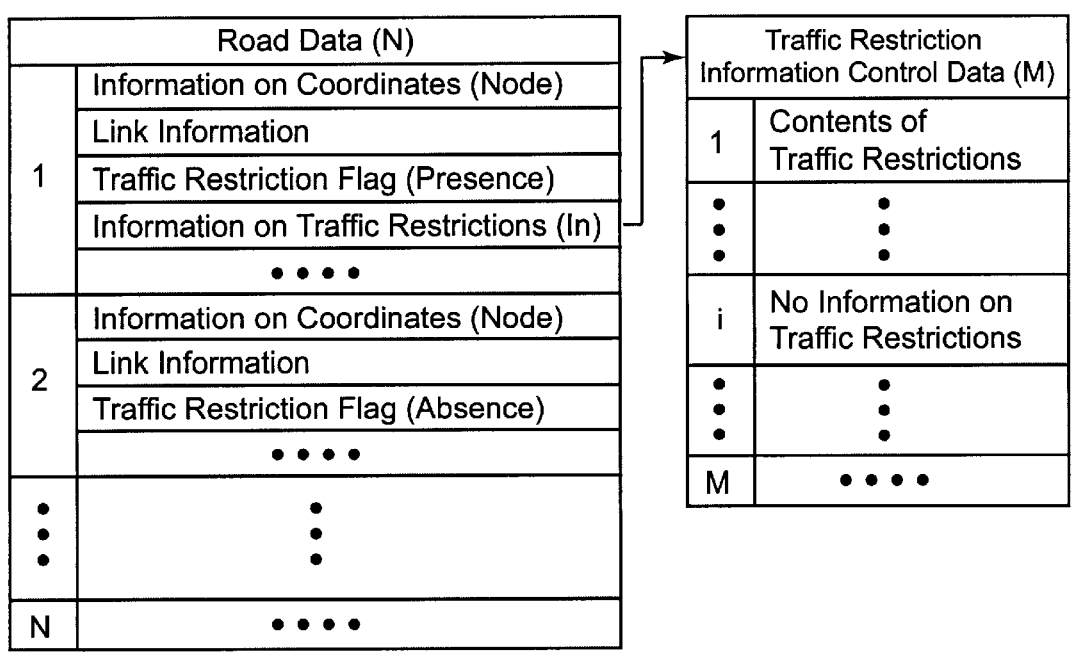
FIG. 3 is another example of road data structure.

FIG. 3 is a diagram showing another example of a road data structure. In this example, a traffic restriction flag is given to each road data. If the traffic flag shows the presence of traffic restrictions, then the traffic restriction information data are separately stored as common data tables by further giving numbers showing the content thereof. For example, with regard to the traffic restriction flag and road data having information on traffic restrictions, the content thereof such as "no access", "no left turn", "no right turn", or the like is recognized by referring to the traffic restriction information management data. Thus, the contents of the traffic restrictions are stored as common data tables, thereby reducing the amount of data.

Next, one embodiment of a guidance terminating point determining method according to the invention is described with reference to FIGS. 4–7. In the invention, when a destination connected to a non-guidance target road, such as a walkway etc., is determined by a vehicle user, a route is searched and route guidance is executed until a connection point between a guidance target road and the non-guidance target road connecting to the destination is determined, thus permitting route guidance to be terminated on the guidance target road and permitting the destination on the non-guidance target road to be reached.

Figure 4:
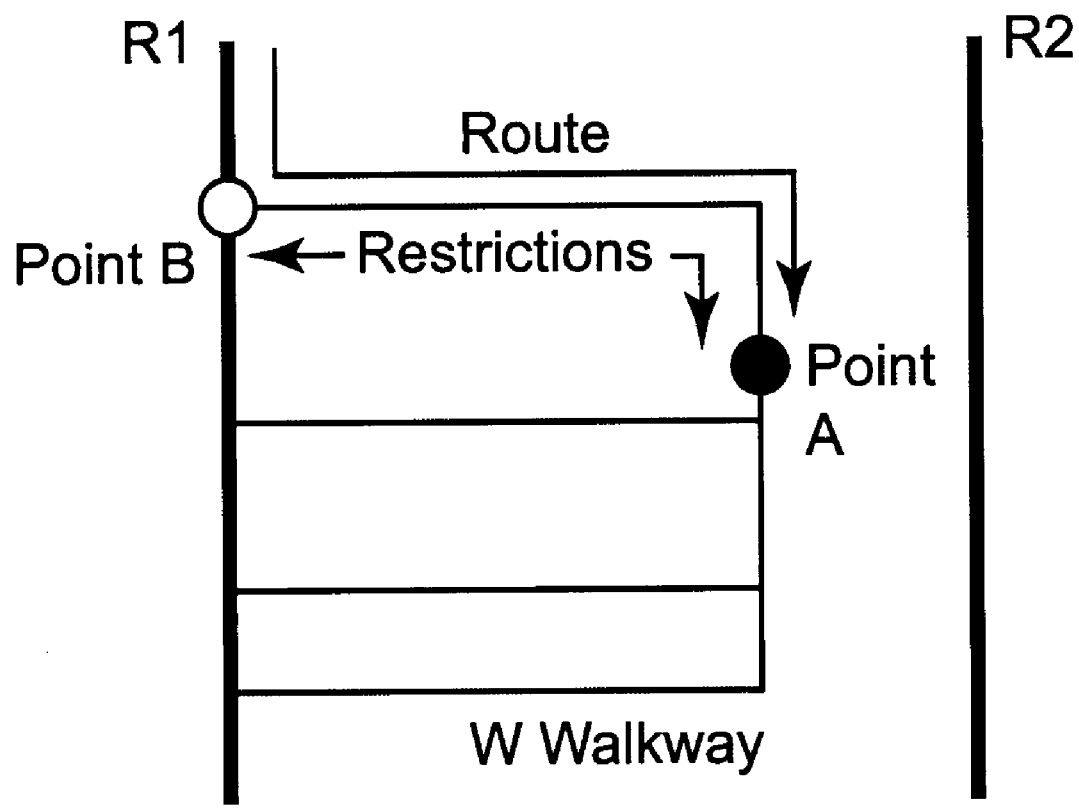
FIG. 4 is a diagram showing an example when there are traffic restrictions on the last road on a route.

FIG. 4 is a diagram showing an example of guidance when a destination is determined on a non-guidance target road with restrictions, such as walkways and the like. R1 and R2 are guidance target roads. A destination point A is connected to R1 with non-guidance target roads, namely, walkways W. A section between R1 and A, identified as point B, is an intersection between the guidance target road R1 and walkway W. Access to the destination point A is restricted by the walkways W. According to the previous art, the guidance target road R2 is much closer to the destination than R1, so a line perpendicularly drawn down from guidance target road R2 to the destination A is determined as a guidance terminating point for route guidance. However, that method may result in the destination not being reached due to no connection between R2 and the non-guidance target road upon which the destination A is located. According to the invention, a route search is made to destination point A and route guidance is carried out up to the last intersection point B that is a connection point between the guidance target road R1 on which the destination can be reached via known road connections to the non-guidance target roads, walkway, W. Although a section from the guidance terminating point A to the destination point B is walkways W, they are connected to guidance target road R1 so that the destination A can be reached. When there are no restrictions, route guidance is simply carried out until the destination point A is reached.

Figure 5:
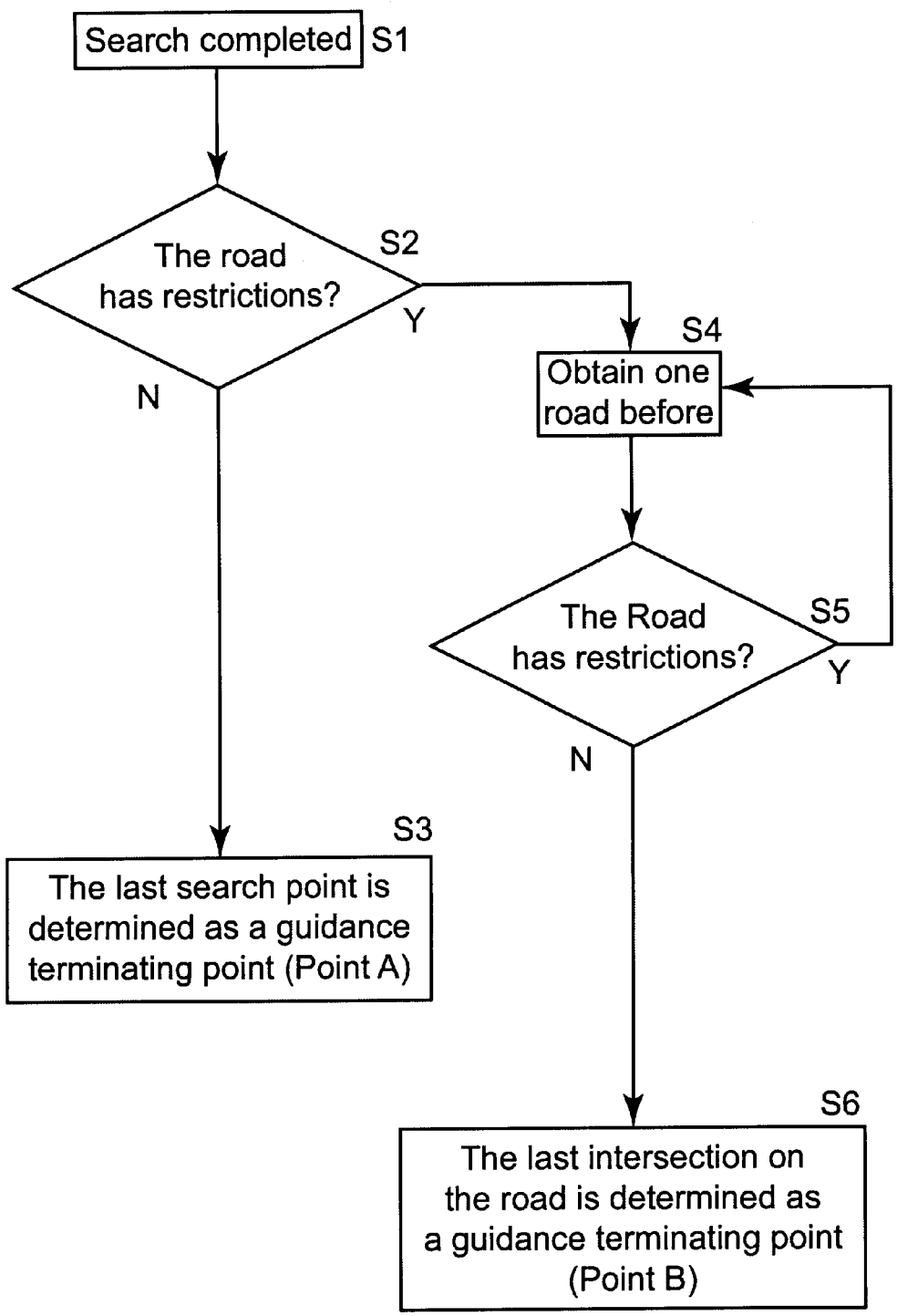
FIG. 5 is a flowchart describing a process for determining a guidance terminating point when there are traffic restrictions on the last road on a route.

FIG. 5 is a flowchart describing a process for the navigation system of the invention. A route search is performed and terminated (Step S1). Then a check for traffic restrictions on roads connected to a destination is performed (Step S2). If there are no restrictions, the destination road is determined as a guidance terminating point (point A in FIG. 4) (Step S3). If there are traffic restrictions on the very last road, the second-last road is searched (Step S4) and checked for restrictions (Step S5). If there are no restrictions on the second-last road, the last intersection to occur between the second-last road and a guidance target road is determined as the guidance terminating point (point B in FIG. 4) (Step S6). If there are restrictions on the second-last road then the third-last road is searched, and the same processing is repeated by returning to Step S4.

Figure 6:
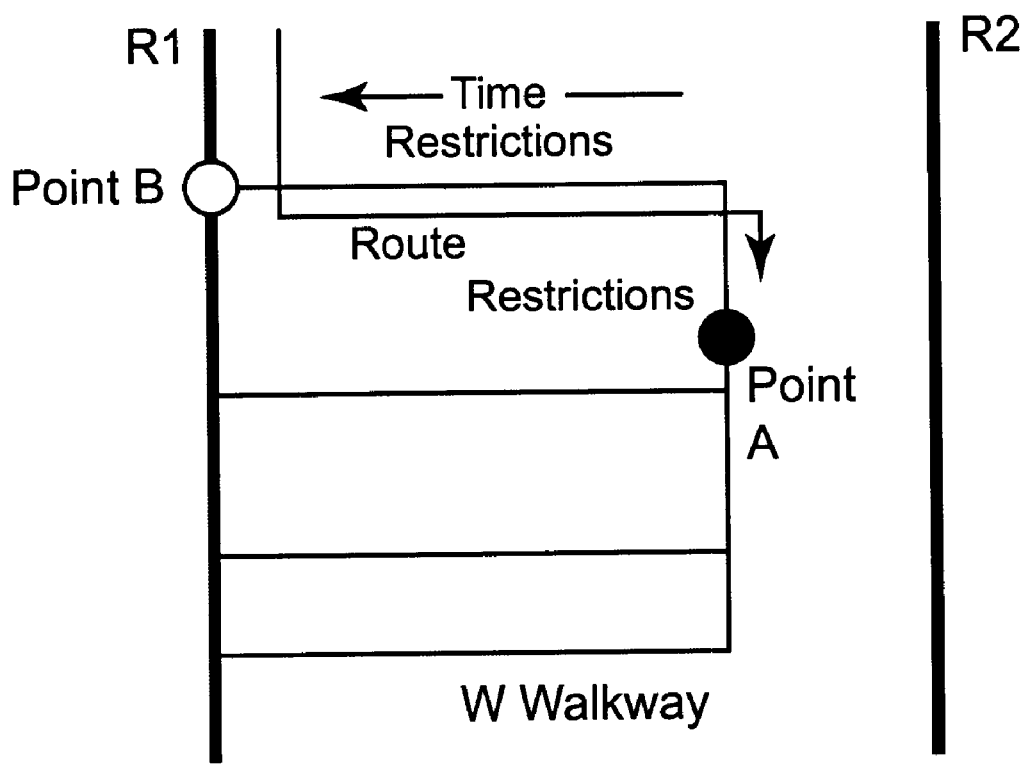
FIG. 6 is a diagram showing when there are time restrictions on the last road on a search route.
Figure 7:
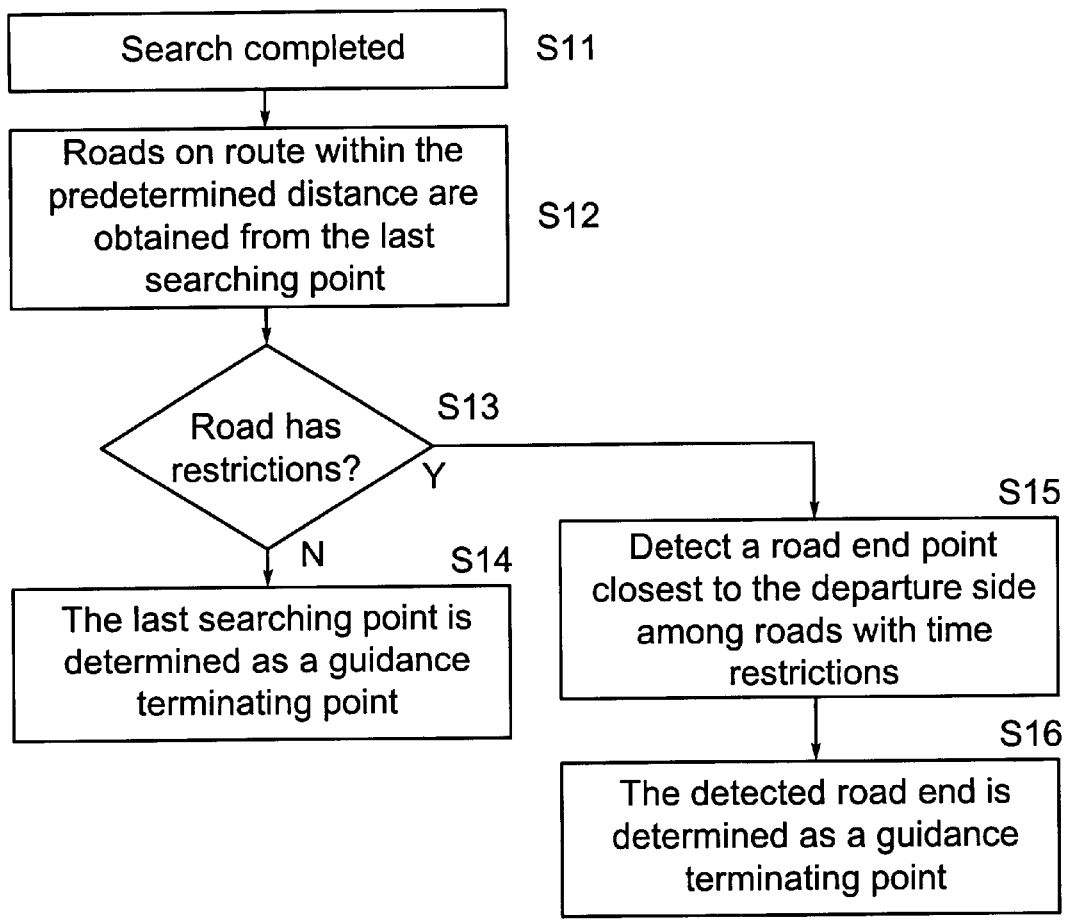
FIG. 7 is a flowchart describing a process for determining a guidance terminating point when there are time restrictions on the last road on a route.

Next described is a navigation system search process having time restrictions on a search route with reference to FIGS. 6 and 7.

In FIG. 6, R1 and R2 are guidance target roads and a destination point A is a non-guidance target road connected to the R1 via walkways W. Time restrictions exist between a point B, that is the last intersection on the guidance target roads R1 and walkways W, and the destination point A such that the route requiring the least amount of time to reach the destination is desired.

FIG. 7 is a flowchart describing the above process. A route search is executed until the destination point A on the non-guidance target road W is located and the search is completed (Step S11). Then a road on the route within the predetermined distance from the last search point (point A) is searched (Step S12) to determine whether there are any restrictions existing on the road (Step S13). If there are no restrictions, the last search point is determined as the guidance terminating point (Step S16). If there are restrictions, a road end close to the destination site from among the restricted roads is detected (Step S15). The detected road end is then determined as the guidance terminating point (Step S16).

Figure 8:
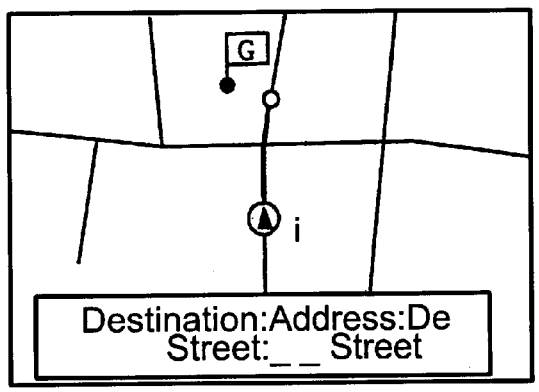
FIG. 8 is a diagram showing a display example around a destination when approaching a guidance terminating point.

FIG. 8 is a diagram showing a display example around a destination when approaching a guidance terminating point. In the figure, a flag mark G, is a destination and i is a guidance terminating point, wherein a section from a vehicle's present position to the guidance terminating point is displayed with a thickened line. An address of the destination and a street name are also displayed on a screen at the same time. Guidance of "Around the destination" may be executed by voice.

Figure 9:
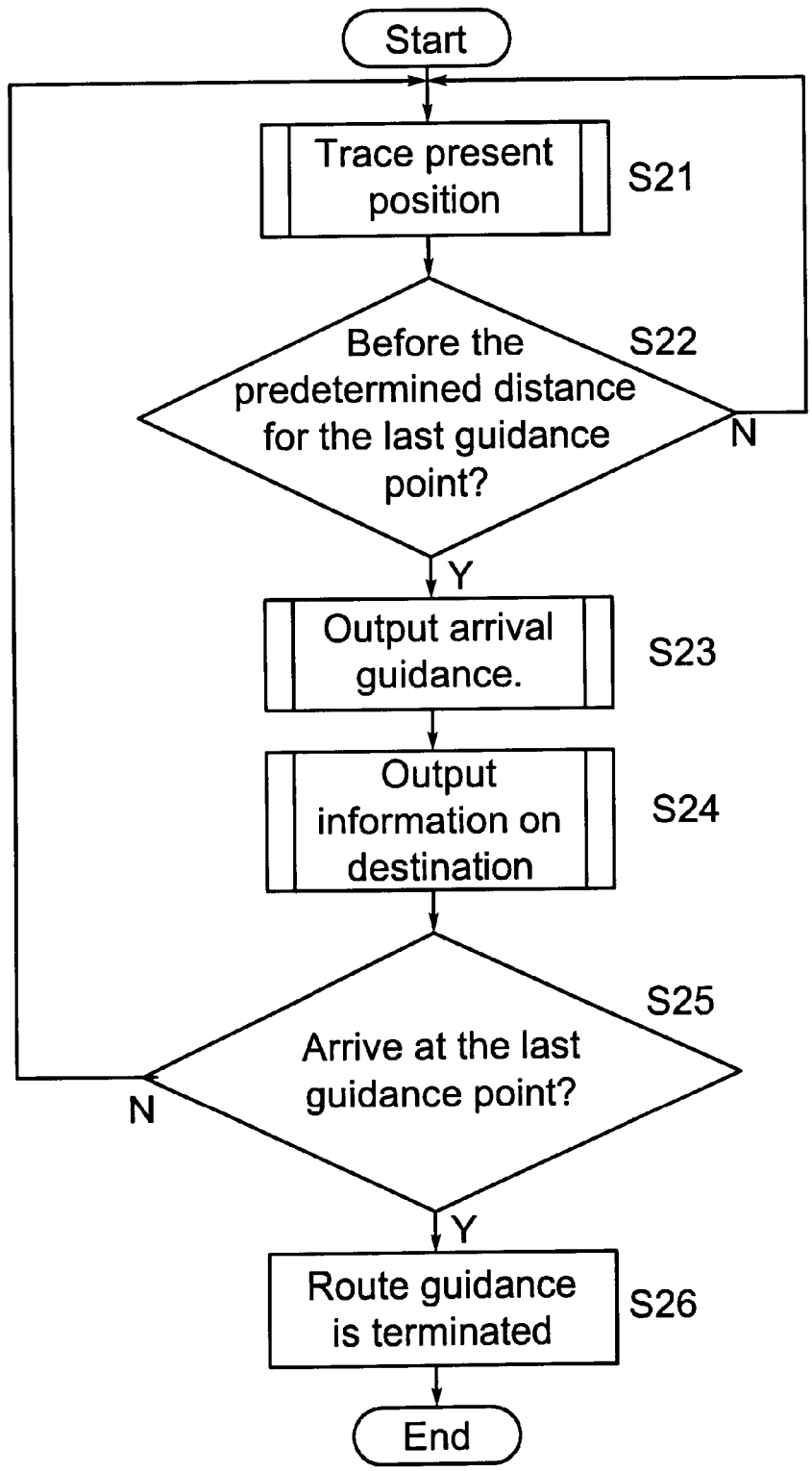
FIG. 9 is a flowchart describing a guidance process when approaching a guidance terminating point.

FIG. 9 is a flowchart describing a navigation system guidance process when approaching a guidance terminating point. The guidance process traces where a vehicle is located on a route by regularly detecting a vehicle's present position while carrying out route guidance (Step S21). Next, it determines whether the vehicle is less than some predetermined distance (e.g. 300 m) from the guidance terminating point on the route, or it determines a vehicle's position by a straight distance calculation (Step S22). If the vehicle is within the predetermined distance, arrival guidance such as voice executed "Around the destination" or the like is output (Step S23) and information on a destination in a guidance screen, such as shown in FIG. 8, is output (Step S24). Then, it is determined whether the vehicle has reached the guidance terminating point (Step S25). If the guidance terminating point is not reached, the above process is repeated, whereas if it is reached, route guidance is terminated (Step S26).

The timing for outputting the information on a destination occurs when the vehicle's present position enters into a road approaching the destination i.e., a guidance terminating point, in addition to when the vehicle is outside the predetermined distance from the guidance terminating point. Further, if the destination and the guidance termination points are different, the outputting of destination information may be determined when the vehicle's present position is within the predetermined distance from the destination, or when it is located outside the predetermined distance based on the guidance terminating point in view of small streets and restriction roads, such as walkways etc., or when the vehicle's present position enters into the road on which the guidance terminating point exists. The vehicle user checks the displayed address of the destination or street name, etc. with the actual address or street name provided by the guidance process, whereby the desired destination can be reached. This information on the destination may be related to information on destination photographs or detailed information, such as information on images and the like. Further, colors and width of the guidance target roads and non-guidance target roads may be displayed differently. By this guidance process, the vehicle user can visually distinguish the displayed roads which facilitates the user reaching the desired destination.

Figures 10A, 10B:
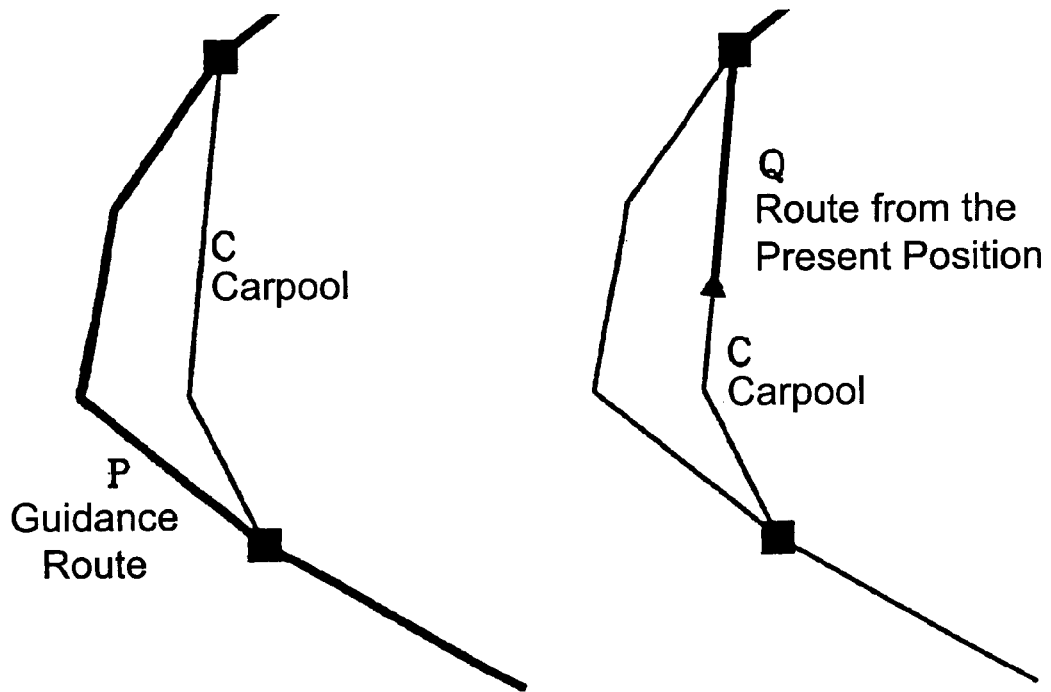
FIGS. 10(*a*) and (*b*) are diagrams showing route guidance in view of carpools.
Figure 11:
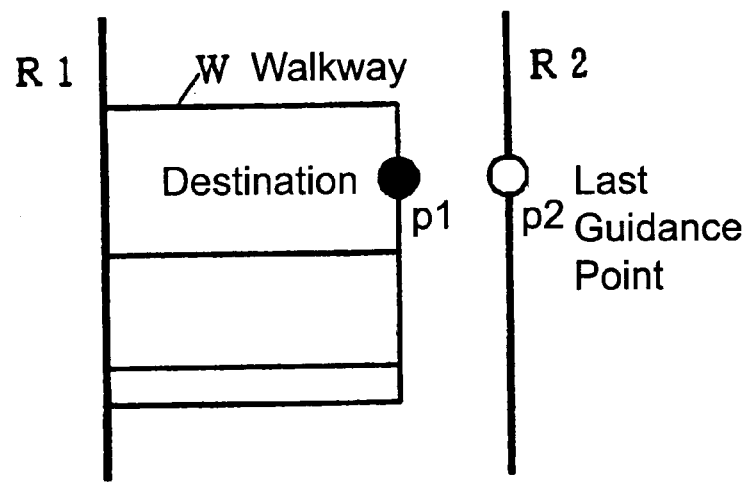
FIG. 11 is a diagram showing a prior method for determining a guidance terminating point.

FIGS. 10(a) and (b) are diagrams showing route guidance in view of carpools. The carpool is a road on which only bus or cars with permission are allowed to travel. As shown in FIG. 10(a), a carpool road C is treated such that a search of it can not be made and a route P that does not travel on the carpool C is searched instead as the first search. However, if it is judged that a general vehicle is traveling on a carpool road, as shown in FIG. 10(b), then only that portion of the carpool road on which a vehicle's present position exists is to be searched and a new route Q is searched from the vehicle's present position on the carpool road. Thereafter guidance is executed to reach the desired destination. Thus, if a vehicle comes to travel on a road such as a carpool road C, on which a general vehicle normally can not travel and for which route guidance is not usually executed, then route guidance can still be properly executed.

What is claimed is:

1. A navigation system, comprising:
    a present position detecting means for detecting a vehicle's present position;
    an input means for inputting information necessary for searching a destination or a route;
    an output means for outputting route guidance information, wherein the vehicle's present position is traced as route guidance is executed;
    an information memory means for storing data on guidance target roads and non-guidance target roads as necessary for a route search;
    a route searching means for searching a route to a destination on the basis of information input by said input means and data stored in said information memory means;
    a judgment means for determining whether non-guidance target roads are included in the searched route; and
    a control means for executing route guidance as the present position of the vehicle is traced and detected by the present position detecting means and for setting a guidance terminating point, wherein route guidance is not executed beyond the guidance terminating point when non-guidance target roads are determined to exist on the searched route by the judgment means.

2. The navigation system according to claim 1, wherein an intersection of a guidance target road connecting to a non-guidance target road is determined as a guidance terminating point when a road connecting to a destination is the non-guidance target road as determined by the judgment means.

3. The navigation system according to claim 1, wherein a road end of the non-guidance target road closest to a path originating side is determined as a guidance terminating point when a road connecting to the destination is the non-guidance target road as a result of a determination by the judgment means.

4. The navigation system according to claim 1, further comprises a means for identifying roads on a route within a predetermined distance from the destination, wherein said judgment means determines whether the roads identified include non-guidance target roads.

5. The navigation system according to claim 1, further comprising guidance information identifying the locale around the destination that is reported when at least one of the vehicle's present position or the destination approaches a predetermined distance from the guidance terminating point.

6. The navigation system according to claim 2, further comprising guidance information identifying the locale around the destination that is reported when at least one of the vehicle's present position or the destination approaches a predetermined distance from the guidance terminating point.

7. The navigation system according to claim 3, further comprising guidance information identifying the locale around the destination that is reported when at least one of the vehicle's present position or the destination approaches a predetermined distance from the guidance terminating point.

8. The navigation system according to claim 4, further comprising guidance information identifying the locale around the destination that is reported when at least one of the vehicle's present position or the destination approaches a predetermined distance from the guidance terminating point.

9. The navigation system according to claim 1, wherein the non-guidance target road is a small street with traffic restrictions.

10. The navigation system according to claim 2, wherein the non-guidance target road is a small street with traffic restrictions.

11. The navigation system according to claim 3, wherein the non-guidance target road is a small street with traffic restrictions.

12. The navigation system according to claim 4, wherein the non-guidance target rad is a small street with traffic restrictions.

13. A memory medium program for use in a navigation system, the navigation system having a present position detecting means for detecting a vehicle's present position; an input means for inputting information necessary for searching a destination or a route; an output means for outputting route guidance information, wherein the vehicle's present position is traced as route guidance is executed; an information memory means for storing data on guidance target roads and non-guidance target roads as necessary for a route search; and a control means for executing route guidance as the present position of the vehicle is traced and detected by the present position detecting means, the memory medium comprising:

a program for searching a route on the basis of information input by said input means and data stored in said information memory means;

a program for determining whether non-guidance target roads are included in the searched route; and a program for judging whether non-guidance target roads are included in a searched route and for setting a guidance terminating point such that route guidance is not executed beyond the guidance terminating point when non-guidance target roads are determined to exist on the searched route by the judgment means.

14. The navigation system according to claim 5, wherein the guidance information are registered data points controlled by category and represented as flags for indicating the presence or absence of the vehicle's position or distance from the destination or guidance terminating point.

15. The navigation system according to claim 6, wherein the guidance information are registered data points controlled by category and represented as flags for indicating the presence or absence of the vehicle's position or distance from the destination or guidance terminating point.

16. The navigation system according to claim 7, wherein the guidance information are registered data points controlled by category and represented as flags for indicating the presence or absence of the vehicle's position or distance from the destination or guidance terminating point.

17. The navigation system according to claim 8, wherein the guidance information are registered data points controlled by category and represented as flags for indicating the presence or absence of the vehicle's position or distance from the destination or guidance terminating point.

* * * * *